United States Patent
Watanabe

(10) Patent No.: US 8,276,455 B2
(45) Date of Patent: Oct. 2, 2012

(54) PRESSURE SENSOR WITH WATER RESTRICTION PLATE

(75) Inventor: Tatsuya Watanabe, Anjo (JP)

(73) Assignee: Denso Corporation, Kariya (JP)

( * ) Notice: Subject to any disclaimer, the term of this patent is extended or adjusted under 35 U.S.C. 154(b) by 1094 days.

(21) Appl. No.: 12/221,674

(22) Filed: Aug. 4, 2008

(65) Prior Publication Data

US 2009/0038399 A1 Feb. 12, 2009

(30) Foreign Application Priority Data

Aug. 8, 2007 (JP) .................................. 2007-206968

(51) Int. Cl.
*G01L 7/00* (2006.01)
(52) U.S. Cl. .......................................... 73/700; 73/706
(58) Field of Classification Search .................. None
See application file for complete search history.

(56) References Cited

U.S. PATENT DOCUMENTS

| | | | |
|---|---|---|---|
| 7,284,435 B2* | 10/2007 | Ueno | 73/706 |
| 7,331,238 B2* | 2/2008 | Wanami et al. | 73/714 |
| 7,398,670 B2 | 7/2008 | Takehara et al. | |
| 7,406,875 B2* | 8/2008 | Wanami et al. | 73/715 |
| 7,454,976 B2* | 11/2008 | Wanami et al. | 73/730 |
| 7,526,963 B2* | 5/2009 | Wanami et al. | 73/753 |
| 7,854,172 B2* | 12/2010 | O'Brien et al. | 73/756 |
| 7,902,843 B2* | 3/2011 | Fang et al. | 324/686 |
| 7,992,441 B2* | 8/2011 | Mulligan et al. | 73/706 |
| 2002/0069700 A1 | 6/2002 | Dirmeyer et al. | |
| 2006/0237255 A1 | 10/2006 | Wanami et al. | |
| 2007/0085313 A1 | 4/2007 | Wanami et al. | |
| 2007/0089520 A1 | 4/2007 | Wanami et al. | |
| 2008/0110273 A1 | 5/2008 | Saito et al. | |
| 2010/0309445 A1* | 12/2010 | Schultz | 355/30 |

FOREIGN PATENT DOCUMENTS

| | | |
|---|---|---|
| JP | 57-138037 | 2/1956 |
| JP | 62-197037 | 12/1987 |
| JP | 02-249740 | 10/1990 |
| JP | 05-248979 | 9/1993 |
| JP | 09-043085 | 2/1997 |
| JP | 11-002580 | 1/1999 |
| JP | 11-064145 | 3/1999 |
| JP | 2000-346737 | 12/2000 |
| JP | 2001-116639 | 4/2001 |

(Continued)

OTHER PUBLICATIONS

Office action dated Mar. 12, 2010 in corresponding Chinese Application No. 2008 10131258.X.

(Continued)

*Primary Examiner* — Lisa Caputo
*Assistant Examiner* — Jermaine Jenkins
(74) *Attorney, Agent, or Firm* — Harness, Dickey & Pierce, PLC

(57) ABSTRACT

A pressure sensor is provided. The pressure sensor includes a body, a sensing element, and a projection part. The body has an internal space and an introduction passage. The internal space is in communication with an outside of the body through the introduction passage. The sensing element is disposed in the internal space of the body and capable of detecting pressure of air in the internal space. The projection part is disposed in the internal space of the body or the introduction passage of the body, and inhibits liquid from entering the internal space.

9 Claims, 3 Drawing Sheets

FOREIGN PATENT DOCUMENTS

| | | |
|---|---|---|
| JP | 2003-004570 | 1/2003 |
| JP | 2003-42885 | 2/2003 |
| JP | 2005-043367 | 2/2005 |
| JP | 2006-306155 | 11/2006 |
| JP | 2006-315525 | 11/2006 |
| JP | 2007-064837 | 3/2007 |
| JP | 2007-114001 | 5/2007 |
| JP | 2007-137333 | 6/2007 |
| JP | 2007-139517 | 6/2007 |
| JP | 2007-300774 | 11/2007 |

OTHER PUBLICATIONS

Extended Search Report dated Jun. 7, 2010 in corresponding European Application No. 08012694.6.

Office action dated May 26, 2009 in corresponding Japanese Application No. 2007-206968.

Office action dated Aug. 30, 2010 in corresponding Chinese Application No. 2008 10131258.X.

* cited by examiner

PRESSURE SENSOR WITH WATER RESTRICTION PLATE

CROSS REFERENCE TO RELATED APPLICATION

The present application is based on Japanese Patent Application No. 2007-206968 filed on Aug. 8 2007, the disclosure of which is incorporated herein by reference.

BACKGROUND OF THE INVENTION

1. Field of the Invention

The present invention relates to a pressure sensor.

2. Description of Related Art

Patent Document 1 recites a pressure sensor. According to Patent Document 1, a pressure sensor is disposed in an internal space of a door of a vehicle in order to sense a collision taking place at a side of the vehicle. When an object collides with the door, the pressure sensor senses a change in pressure of the internal space of the door. For detection of such pressure change, the pressure sensor includes an introduction passage. The introduction passage introduces the air in the internal space of the door into a pressure detection surface of the pressure sensor. The introduction passage is formed to extend in a direction perpendicular to the pressure detection surface of the pressure sensor, that is, in a horizontal direction.

Patent document 2 recites another pressure sensor. According to Patent Document 2, a pressure sensor has an introduction passage, which leads to a pressure detection surface of the pressure sensor in a similar manner to that according to Patent Document 1. The introduction passage is formed to extend in a direction perpendicular to the pressure detection surface of the pressure sensor.

Patent document 3 recites another pressure sensor. A pressure sensor includes a sensing element covered or coated by a gelled resin. When an air pressure applied to the sensing element varies, the gelled resin is deformed. Pressure is transmitted to a sensor circuit accordingly. A change in pressure is detected using a sensor circuit.

Patent Document 1: IP-A-2006-306155 corresponding to US-A-2006/0237255
Patent Document 2: IP-A-2003-4570
Patent Document 3: IP-A-2001-116639

The internal space of a door of a vehicle typically gives an environment where an object may get wet. When a pressure sensor is disposed in such an environment, it is necessary to restrict water accumulation in the sensor.

When the sensing element disclosed in Patent Document 3 is used as a sensing element of a pressure sensor, it may be possible to prevent a sensor circuit from directly getting wet. However, according to a pressure sensor disclosed in Patent Document 1, since an introduction passage is formed to extend in a horizontal direction, water can enter the introduction passage.

When such a pressure sensor is used in a remarkably low-temperature environment, water in the introduction passage may freeze on a surface of a gelled resin or a pressure detection surface of the sensing element. When an ice sticks to the pressure detection surface of a sensing element, a change in pressure of the internal space of a door causes less deformation of the gelled resin. It becomes thus difficult to detect a pressure with high accuracy. In addition, when the body (i.e., the door) in which the pressure sensor is disposed is displaced, an inertia force acts on the ice that sticks to the pressure detection surface. Due to the inertia force acting on the ice, the sensing element may sense a pseudo pressure change. To avoid the above-described difficulties, it may be necessary to configure a pressure sensor so that water does not stay on the pressure detection surface.

SUMMARY OF THE INVENTION

In view of the above-described difficulty, it is an object of the present invention to provide a pressure sensor configured so that water does not accumulate in a pressure sensor.

According to a first aspect of the present invention, a pressure sensor is provided. The pressure sensor includes a body and a sensing element. The sensing element includes a first surface. The first surface includes a pressure detection surface. The sensing element senses pressure of air placed adjacent to the pressure detection surface. The body includes an introduction passage having an open end. The introduction passage communicates the pressure detection surface with an outside of the body through the open end. The sensing element is disposed in the body so that the first surface of the sensing element is exposed to a space defined by the introduction passage. The introduction passage includes a first passage portion extending downward from a region adjacent to the first surface of the sensing element. The pressure sensor further includes a plate disposed in the first passage portion so that the plate extends across a region defined by lines connecting between the first surface of the sensing element and the open end of the introduction passage. The plate inhibits water from reaching to the sensing element.

According to the above pressure sensor, the plate inhibits water from reaching to the sensing element. Since the first passage portion extends downward from the region adjacent to the first surface of the sensing element, water is not accumulated in the first passage portion when the water enters the first passage portion. Therefore, it is possible to restrict water accumulation on the first surface of the sensing element.

According to a second aspect of the present invention, a pressure sensor is provided. The pressure sensor includes a sensing element and a body. The sensing element includes a first surface. The first surface includes a pressure detection surface. The sensing element senses pressure of air placed adjacent to the pressure detection surface. The body includes an introduction passage having an open end on a surface of the body. The introduction passage communicates the pressure detection surface with an outside of the body through the open end. The sensing element is disposed in the body so that the first surface of the sensing element is exposed to a space defined by the introduction passage. The introduction passage includes a first passage portion, which extends downward from a region adjacent to the first surface. The introduction passage includes a second passage portion having a substantially L-shape. The second passage portion has a horizontal passage part extending in a horizontal direction from a lower end of the first passage portion and a vertical passage part extending downward from one end of the horizontal passage part. The body has an inner wall defining the horizontal passage part. The inner wall has a lower surface inclining downward toward the open end.

According to the above pressure sensor, since the second passage portion has substantially L-shape, the low end portion of the first passage portion is displaced from the open end of the introduction passage with respect to an up-down direction of the pressure sensor. Therefore, it is possible to inhibits water from entering the first passage portion.

According to a third aspect of the present invention, a pressure sensor is provided. The pressure sensor includes a body, a sensing element, and a projecting part. The body has an internal space and an introduction passage. The internal space is in communication with an outside of the body through the introduction passage. The sensing element is disposed in the internal space of the body and capable of detecting pressure of air in the internal space. The projecting part is disposed in one of the internal space of the body and the introduction passage of the body so as to inhibit water from entering the internal space.

According to the above pressure sensor, the projecting part inhibits water from reaching to the sensing element. Since the projecting part is disposed in one of the internal space of the body and the introduction passage of the body. Therefore, it is possible to restrict water accumulation on the sensing element.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Example Embodiment

A pressure sensor 1 according to an example embodiment is described below with reference to FIGS. 1 to 3.

The pressure sensor 1 can be used as a sensor that is disposed in an internal space of a door of a vehicle, and that detects a change in pressure of the internal space of the door to sense a collision between the door of the vehicle and an object. In addition, when the pressure sensor 1 is mounted in the door of the vehicle, first and second directions of the pressure sensor 1 shown in FIG. 1, respectively, correspond to an upper direction and a lower direction of the vehicle.

For the above-described reasons, it is assumed in the following description that the first and second directions associated with the pressure sensor 1 correspond to an upper direction and a lower direction, respectively. In addition, it is assumed that the view direction of the pressure sensor 1 in FIG. 1 corresponds to a lateral direction of the vehicle.

Figure 1:
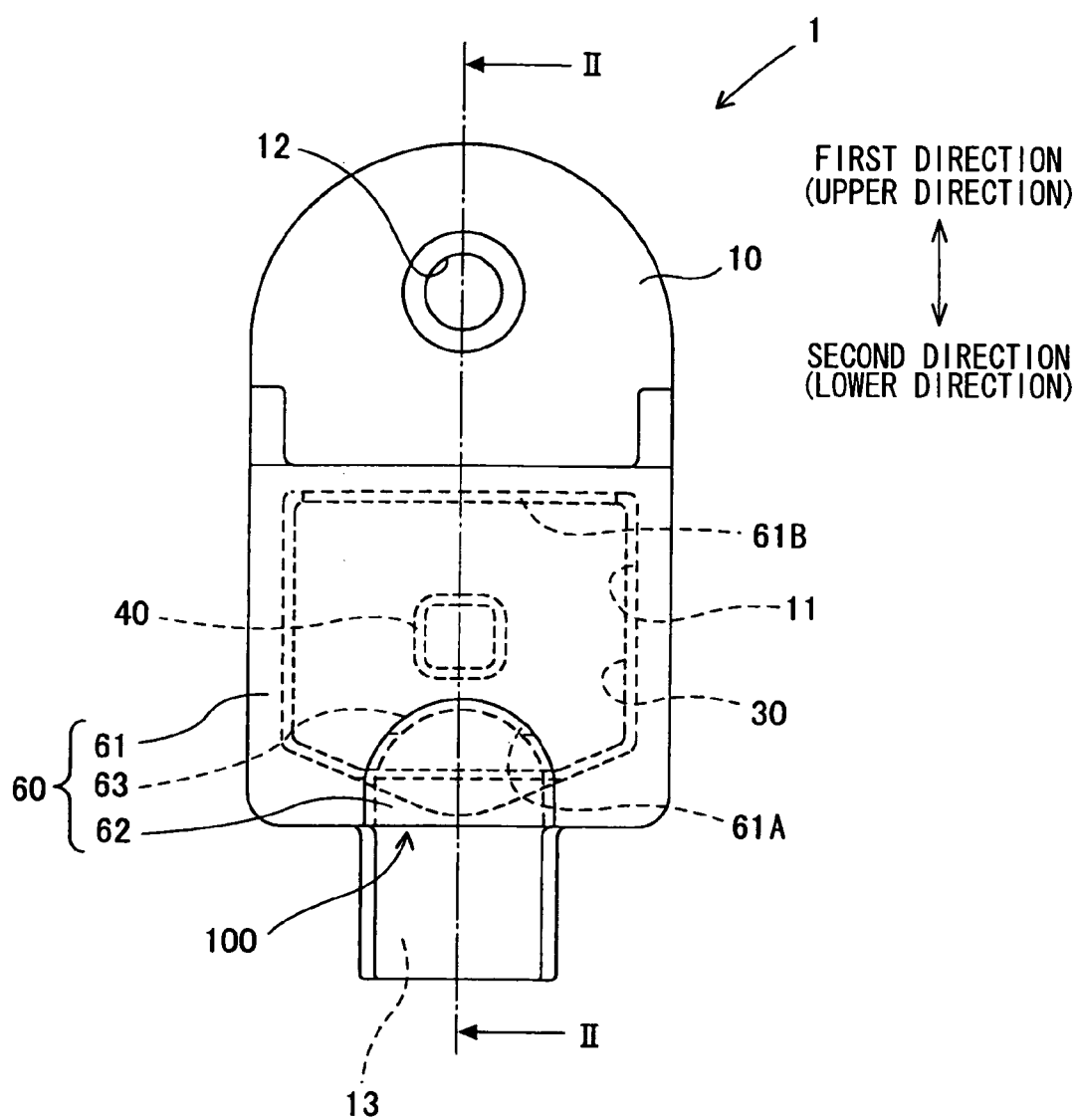
FIG. 1 is a perspective view of a pressure sensor.
Figure 2:
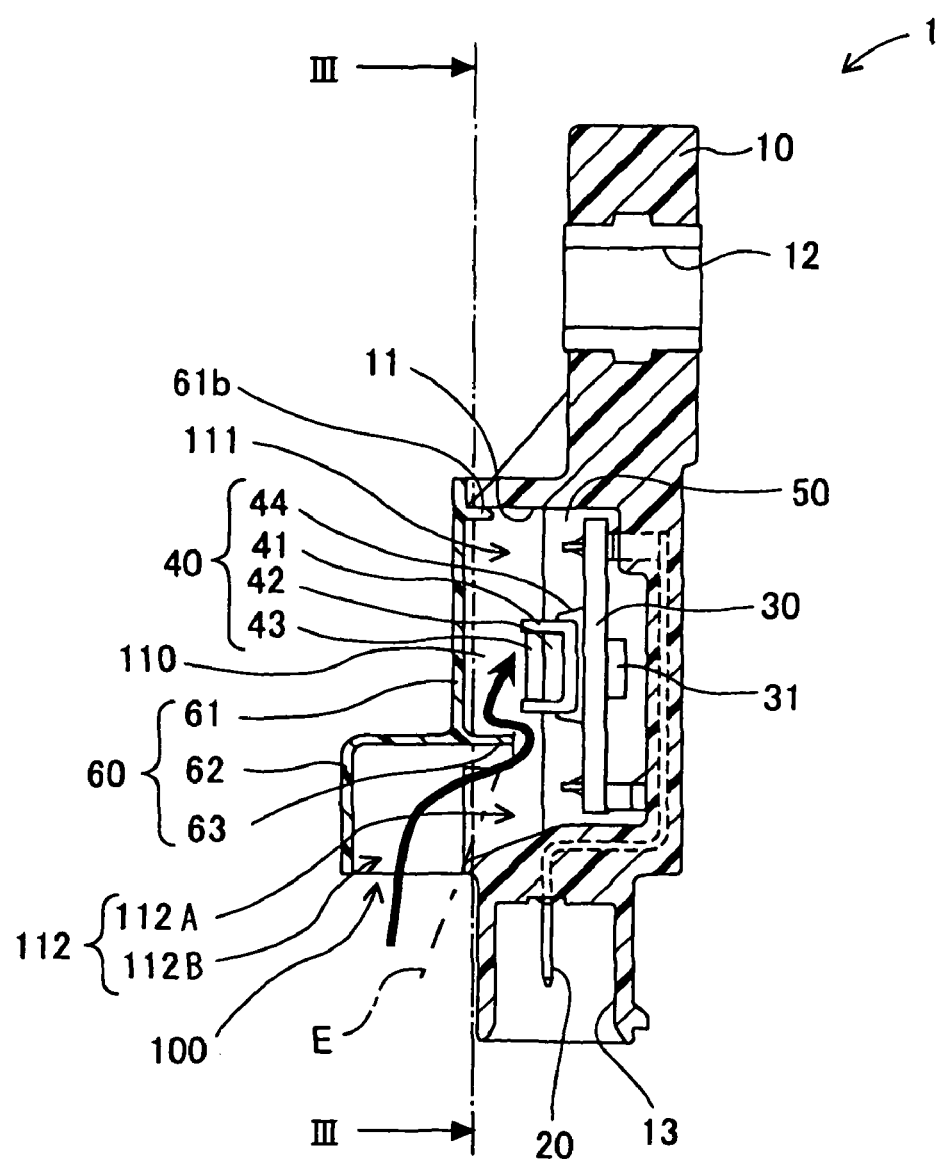
FIG. 2 is a cross sectional view of the pressure sensor taken along line II-II in FIG. 1.
Figure 3:
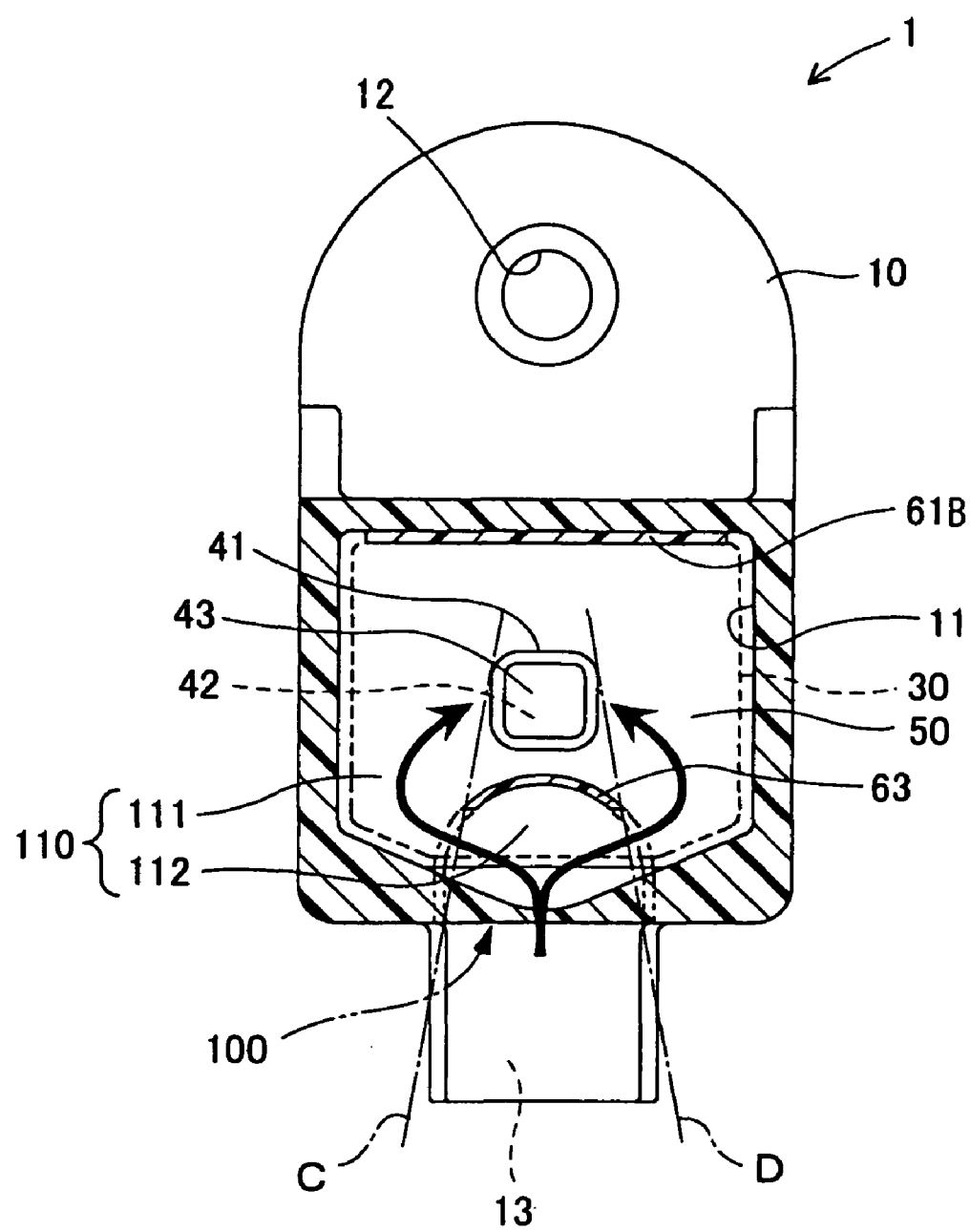
FIG. 3 is another cross sectional view of the pressure sensor taken along line III-III in FIG. 2.

As shown in FIGS. 1 to 3, the pressure sensor 1 includes a case body 10 (i.e., body 10), a terminal 20, a printed board 30, a sensing element 40, a potting resin 50, and a cover 60. The case body 10 is made of resin. A concave portion 11 is formed on a side surface of the case body 10. In FIG. 2, the side surface corresponds to a surface that illustrated as a left side of the case body 10. The concave portion 11 can be used for placing a board therein. As shown in FIG. 3, the concave portion 11 has a substantially pentagonal shape (i.e., a shape like a home plate used in Baseball) when the concave portion 11 is viewed from an open end of the concave portion 11 to a bottom of the concave portion 11. More specifically, as shown in FIG. 3, a lower surface of the concave portion 11 is inclined downward (i.e., in FIG. 3, inclined downward from both the right hand-side and the left-hand side to the center). As shown in FIG. 2, a part of the lower surface is inclined downward toward an open end 100 of the introduction passage 110, the part of the lower surface being located around the center of the lower surface. In other words, the part of the lower surface located adjacent to the open end 100 has the lowest position among another parts of the lower surface. The lower surface is inclined toward the part having the lowest portion.

The case body 10 has a through hole 12 at an upper portion of the case body 10. As shown in FIG. 2, the through hole 12 extends in the lateral direction (i.e., left-hand side to the right-hand side of FIG. 2). The through hole 12 is used for fixing the case body 10 to an inner panel of a door of the vehicle by inserting a bolt in the through hole 12. The case body 10 is fixed so that the concave portion 11 faces toward an outer panel (not shown) of the door. The case body 10 has a concave portion 13 for connector at a lower portion of the case body 10. A open end of the concave portion 13 is directed downward.

The terminal 20 is provided in the case body 10 by insert-molding. One end of the terminal 20 projects or sticks out from a bottom surface of the concave portion 11. The other end of the terminal 20 projects or sticks out from the concave portion 13.

The printed board 30 is formed to have such a shape that the printed board 30 is disposed on the bottom of the concave portion 11. The printed board 30 is a double-sided printed circuit board. An electronic element 31 is mounted on one side (i.e., a rear surface) of the printed board 30. In FIG. 2, the rear surface is illustrated as a surface placed on the right-hand side of the printed board 30. The printed board 30 is supported by the one end of the terminal 20 and electrically connected with the terminal 20.

The sensing element 40 is capable of detecting pressure. More specifically, the sensing element 40 includes an element body 41, a sensor circuit part 42, a gelled coating member 43, and a lead 44. The element body 41 is made of resin and has a concave portion. The element body 41 is substantially rectangular in shape. The sensor circuit part 42 is disposed on a bottom of the concave portion of the element body 41. When pressure is applied to a surface of the sensor circuit part 42, the sensor circuit part 42 outputs an applied-pressure-dependent electrical signal. The gelled coating member 43 fills the concave portion of the element body 41 so as to cover the surface of the sensor circuit part 42. A surface of the gelled coating member 43 is exposed, and the exposed surface provides a pressure detection surface of the sensing element 40. When the exposed surface of the gelled coating member 43 receives air pressure, the gelled coating member 43 transmits pressure to the sensor circuit part 42. That is, the sensor circuit part 42 is capable of detecting a pressure of an air placed adjacent to the exposed surface of the gelled coating member 43. The gelled coating member 43 functions as a waterproof for the sensor circuit part 42. One end of the lead 44 is connected with the sensor circuit part 42. The other end of the lead 44 projects to an outside of the element body 41. The sensing element 40 is mounted on a surface of the printed board 30 so that the exposed surface of the gelled coating member 43 is directed to the open end of the concave portion 11. In FIG. 2, the surface on which sensing element 40 is mounted is illustrated as a left-hand side surface of the printed board 30. The sensing element 40 is mounted on the surface of the printed board 30 so that the lead 44 of the sensing element 40 is electrically connected with a circuit, which is printed on a surface of the printed board 30.

The potting resin 50 fills a bottom part of the concave portion 11. More specifically, the bottom part of the concave portion 11 is filled with the potting resin 50 so that the printed board 30 and the lead 44 of the sensing element 40 are not exposed, and so that the gelled coating member 43 and a surface around the open end of the concave portion of the element body 41 are exposed. That is, after the bottom part of the concave portion 11 is filled with the potting resin 50 filling, "the surface around the open end of the element body 41 and the surface of the gelled coating member 43" are exposed from the potting resin 50 in the lateral direction of the vehicle. The above portion exposed from the potting resin 50 is also referred to hereinafter as a lateral end surface of the sensing element or a first surface of the sensing element.

The cover 60 is made of resin. The cover 60 is formed to partially cover the open end of the concave portion 11 of the case body 10. The cover 60 and the case body 10 provides an introduction passage 110 having an open end 100 (i.e., introduction hole). Through the introduction passage 110, the pressure detection surface of the sensing element 40 is in communication with the open end 100. Through the open end 100, the introduction passage 110 is in communication with the internal space of the door. That is, the introduction passage 110 is in communication with an outside of the case body 10 through the open end 100. Hereinafter, the internal space of the door is also referred to as a pressure detection space. The cover 60 includes a first cover portion 61 for defining a first passage portion 111, and a second cover portion 62 for defining a second passage portion 112. The cover 60 further includes a plate 63 (i.e. a projecting part 63) for waterproof.

The first cover portion 61 and the case body 10 define a first passage portion 111, which is a part of the introduction passage 110. The first cover portion 61 has a substantially rectangular plate shape. As shown in FIG. 3, the first cover portion 61 includes a cutout part 61A, which has a substantially circular ark shape. In FIG. 3, the cutout part 61A is located a lower side of the first cover portion 61. The shape of the first cover portion 61 is substantially similar to a shape of the open end of the concave portion 11 of the case body 10. As shown in FIG. 2, the first cover portion 61 includes a projection portion 61B, which projects toward an inside of the introduction passage 110 (i.e., toward the right-hand side of FIG. 2). The first cover portion 61 contacts with a part of the open end of the concave portion 11. The first cover portion 61 is arranged so that the projection portion 61B is engaged with an upper portion of the inner wall of the concave portion 11, and so that the cutout part 61A is directed to a lower side of the vehicle. The cutout part 61A is disposed lower than the sensing element 40. The first passage portion 111 is formed in an up-to-down direction. The lateral end portion of the sensing element 40 is exposed to a space enclosed by the first passage portion 111. At least, the first passage portion 111 may be formed to extend downward from a space adjacent to the lateral end surface of the sensing element 40. The first passage portion 111 is formed to have a cross section greater than or equal to 30 mm$^2$, the cross section taken along a plane perpendicular to an extension direction of the first passage portion 111.

The second cover portion 62 and the case body 10 form a second passage portion 112. The second passage portion 112 is a part of the introduction passage 110. The pressure detection surface of the sensing element 40 is in communication with the open end 100 through the introduction passage 110. The second cover portion 62 is integrally formed with the first cover portion 61 at the cutout part 61A of the first cover portion 61. The second cover portion 62 includes a projection part, which projects toward the open end of the concave portion 11. The second cover portion 62 forms the open end 100 at the lower end of the second cover portion 62. More concretely, the second passage portion 112 has a substantially L-shape, and includes a horizontal passage part 112A and a vertical passage part 112B. The horizontal passage part 112A extents from lower surfaces of the second cover portion 62 and the concave portion 11. The vertical passage part 112B extends downward from an one end of the horizontal passage part 112A (c.f., a left-hand side of FIG. 2). Through the vertical passage part 112B, the horizontal passage part 112A is in communication with the open end 100. The second passage portion 112 is formed to have a cross section greater than or equal to 30 mm$^2$, the cross section taken along a plane perpendicular to an extension direction of the second passage portion 112.

As described above, the part of the lower surface of the concave portion 11 located adjacent to the open end 100 has the lowest position around the center of the lower surface. The lower surface is inclined toward the part having the lowest position. In other words, the lower surface of the horizontal passage part 112A is formed to be inclined downward toward the open end 100.

The plate 63 for waterproof (i.e., a water attachment prevention plate 63) has a substantially circular plate shape. The plate 63 is integrally formed with the first cover portion 61. The plate 63 is connected with the first cover portion 61 at a lower part of the first cover portion 61. The plate 63 projects toward the concave portion 11. The plate 63 is disposed lower than the sensing element 40. The plate 63 has an upper surface having a convex shape. The upper surface having the convex shape is directed to an upper part of the vehicle. In other words, the upper surface of the plate 63 is gradually inclined toward ends (i.e., free ends) of the circular shaped plate 63. The plate 63 has a lower surface having a concave shape. In addition, the ends of the plate 63 have a distance there between and the distance is larger than a width of the sensing element 40 in a lateral direction. More specifically, the free ends of the plate 63 are located outside of a region defined between a line C and a line D, which are shown by dashed-dotted lines in FIG. 3. The line C connects a left side portion of the open end 100 with a left side portion (a periphery of the lateral end surface) of the element body 41 of the sensing element 40. The line D connects a right side portion of the element body 41 with a right side portion of the open end 100.

As shown in FIG. 2, the projection portion of the plate 63 has an end. The end is placed so that the end of the projection portion is not in contact with the potting resin 50. In addition, the end of the projection portion of the plate 63 is located closer to the bottom of the concave portion 11 with respect to a line E. In FIG. 2, the line E is shown as a dashed-dotted line. The line E connects a part of a lower periphery of the element body 41 with a part of a periphery of the open end 100. The above-described part of the lower periphery of the element body 41 is included in the exposed surface of the element body 41. The above-described part of the periphery of the open end 100 is located closer to the bottom side of the concave portion 11 than another part of the periphery of the open end 100 is.

The above-described positional relation among the free ends of the plate 63 and the end of projection portion of the plate 63 can be also described as follows: the plate 63 disposed in the first passage portion 111 so that the plate 63 crosses a line connecting between the lateral end surface of the sensing element 40 and the open end 100 of the introduction passage 110.

As described above, the introduction passage 110 is formed to have the cross section greater than or equal to 30 mm$^2$, the cross section taken along a plane perpendicular to the extension direction of the introduction passage 110. That is, the first passage portion 111 is formed to have the cross section greater than or equal to 30 mm$^2$, the cross section taken along a plane perpendicular to the extension direction of the first passage portion 111. Also, the second passage portion 112 is formed to have the cross section greater than or equal to 30 mm², the cross section taken along the plane perpendicular to the extension direction of the second passage portion 112. In the followings, explanation is given on why the cross section is set to a value greater than or equal to 30 mm².

Following experiments were made. Circular tubes having various radii were prepared. Water entered the circular tubes. It was studied whether the water accumulated in the tube due to a surface tension of the water, and whether the accumulated water blocks a passage of the tube.

As a result, when tubes have cross sections smaller than 30 mm², the water accumulated in the tube and blocked a passage of the tube. When tubes have cross sections greater than or equal to 30 mm², the water did not accumulate in the tube and did not block a passage of the tube.

A strict condition for water accumulation in a tube is given when the tube has a circular cross section. Therefore, when a tube has a cross sectional shape other than a circular shape such as a quadrangular shape, and when the quadrangular tube is equal to the circular tube in cross sectional area, it is possible to restrict the water accumulation in the quadrangular tube. Thus, it is possible to set the cross sectional area of the introduction passage 110 based on the cross section area of corresponding circular tube. That is, even when the introduction passage has a cross section having an arbitrary shape, if the cross sectional area is greater than or equal to 30 mm², it is possible to restrict accumulation of water when the water enters the introduction passage. According to the present embodiment, since the introduction passage 110 has a cross section greater than or equal to 30 mm², it is difficult for water to accumulate in the introduction passage 110 when the water enters the introduction passage 110.

In the followings, explanation is given on air flow from the internal space (i.e., pressure detection space) of the door to the pressure detection surface of the sensing element 40. In FIGS. 2 and 3, the air flow is illustrated as arrows. When air enters from the internal space of the door into the open end 100, the air travels through second passage portion 112 in L-shape flow. Then, the air travels while bypassing a region defined between the end of the projection portion of the plate 63 and the potting resin 50 (c.f., the arrow in FIG. 2) and while bypassing regions outside the both free ends of the plate 63 (c.f., the arrow in FIG. 3). Then, the air passes through a region surrounding the plate 63, and reaches to the pressure detection surface of the sensing element 40.

According to the above air flow, when a pressure of the internal space of the door increases, an air moves to the detection surface of the sensing element 40. In the above flow, the air moving to the detection surface corresponds to the increase in the pressure. Thus, it is possible for the sensing element 40 to detect a change in pressure reliably.

In the followings, explanation is given on a path of entry of water. Water typically enters the internal space of the door of the vehicle from up to down. Since the open end 100 of the pressure sensor 1 is directed downward, it is possible to prevent such water from entering the pressure sensor 1 through the open end 100. When the water moves downward and splashes at the lower surface of the internal space of the door, the water moves upward from the lower surface. In the above case, the splashed water may enter the pressure sensor 1 through the open end 100.

However, as described above, the plate 63 is disposed in the first passage portion 111 so that the plate 63 extends across a region defined by lines connecting between the open end 100 of the introduction passage 110 and the lateral end surface of the sensing element 40. After the water splashes at the lower surface of the internal space of the door, the splashed water moves approximately linearly. Therefore, when the splashed water enters from the open end 100, the water inevitably hits against the lower surface of the plate 63.

The plate 63 is formed so that the lower surface of the plate is circular and concave in shape. The water that has hit against the lower surface of the plate 63 thus moves in a space surrounded by the lower surface of the plate 63, or travels below the plate 63. The water that has splashed at the lower surface of the internal space of the door travels only below the plate 63.

The water that has bounced at the lower surface of the plate 63 exits from the open end 100, or moves towards the lower surface of the concave portion 11. As described above, the lower surface of the concave portion 11 has the lowest portion adjacent to the open end (c.f., a center region in FIG. 3), and the lower surface of the concave portion 11 is inclined downward. That is, the lower surface of the horizontal passage part 112A is inclined downward toward the open end 100. The water on the lower surface of the concave portion 11 moves toward a center part (i.e., the center region in FIG. 3) of the lower surface of the concave portion 11, and then, the water exits from the open end 100.

As described, basically, the water does not enter a region above the plate 63. But if the water enters the region, the water inevitably moves toward a region below the plate 63 since an upper surface of the plate 63 is inclined toward the free ends of the plate 63. Then, the water exits from the open end 100 in similar manner to the above-described case.

According to the above configuration of the pressure sensor 1, although the introduction passage 110 having a cross section greater than or equal to 30 mm² may facilitate the entry of water, it is possible to reliably inhibit water from entering the sensing element 40. In addition, when water enters the introduction passage 110, the water is reliably caused to exit from the open end 100. It is thus possible to reliably restrict accumulation of water in the introduction passage 110.

Therefore, when the vehicle is used in a low temperature environment, it is possible to restrict accumulation of water in the introduction passage 110. It is thus possible to restrict an occurrence of a failure or a problem resulting from the freezing of the accumulated water. By using the pressure sensor 1 according to the present embodiment, it is possible to reliably detect a change in pressure of the internal space of the door. When an object collides with the door of the vehicle, it is possible to reliably detect such a collision. In other words, it is possible to restrict error detection.

In the above description, the plate 63 has the upper surface having a substantially circular arc and convex shape. Alternatively, it may be sufficient for the upper surface of the plate 63 to have such a shape that the upper surface is inclined downward toward both ends of the upper surface. For example, the upper surface may have a tapered and convex shape.

In addition, the plate 63 has the lower surface having a substantially circular arc and concave shape. Alternatively, it may be sufficient for the lower surface to have such a shape that the splashed water is not allowed to move upward. For example, the lower surface may have a tapered and concave shape.

In addition, the end of the projection part of the plate 63 is spaced away from a surface of the potting resin 50. Alternatively, the end of the projection part of the plate 63 may be in contact with a surface of the potting resin 50, improving water-entry-prevention effect. In this case, since the projection part of the plate 63 blocks a part of air passage, pressure detection accuracy is lowered. Thus, an appropriate configuration may be determined by comparing between a waterproof effect and performance of pressure detection.

In addition, the introduction passage 110 includes the second passage portion 112 being substantially L-shape. Alternatively, the introduction passage 110 may have a tortuous shape.

According the above-described example embodiment, the pressure sensor 1 has the following advantages.

The plate 63 is disposed in the first passage portion 111 so that the plate 63 extends across a region defined by lines connecting between the lateral end surface of the sensing element 40 and the open end 100 of the introduction passage 110. Thus, the plate effectively inhibits water from directly reaching to the sensing element 40 because water moves linearly. Air targeted for detecting pressure can move anywhere when a space exits. The pressure sensor 1 is configured so that there exits a space around the line connecting between the lateral end surface of the sensing element 40 and the open end 100 of the introduction passage 110 the air. Therefore, it is possible to reliably sense air pressure in the pressure detection space. Further, the first passage portion 111 extends downward from a region adjacent to the lateral end surface of the sensing element 40. Thus, if water enters the first passage portion 111, the water does not stay on the lateral end surface of the sensing element 40, and the water falls down toward the lower end of the first passage portion 111.

Furthermore, the second passage portion 112 is substantially L-shaped. The lower end of the first passage portion 111 and the open end of the introduction passage 110 are out of alignment as viewed from the top. It is possible to restrict entry of water into the first passage portion when the water enters from the open end. According to the above configuration, the L-shaped second passage portion 112 causes an effect of the water entry restriction, and the plate 63 also causes the effect of the water entry restriction.

Furthermore, the side wall defining the horizontal passage part 112A of the second passage portion 112 has the lower surface inclined downward toward the open end (100). Thus, when water enters the first passage portion 111 or the horizontal passage part 112A of the second passage portion 112, the water moves toward the lower surface and reliably exits from the open end (100). That is, it is possible to effectively inhibit water from staying in the second passage portion 112. If by any chance water stays in the first passage portion 111 or the second passage portion 112, and if the water freezes, the ice may block the passage portion, causing the air not to move the sensing element 40, and causing the sensing element 40 not to reliably sense pressure. Therefore, since the pressure sensor 1 effectively inhibits water from staying, the pressure sensor 1 is capable of reliably sensing pressure.

Furthermore, the plate 63 has the lower surface having a concave shape. Since the lower surface has a concave shape, the water that hits against the lower surface of the plate 63 surely falls downward. That is, the water that hits against the lower surface is inhibited from moving toward the lateral end surface of the sensing element 40.

Furthermore, the plate 63 has the upper surface inclined towards the free ends. If water enters a region above the plate 63, the water moves down to the upper surface of the plate 63, and then, the water on the upper surface moves downward because the upper surface is inclined downward toward the free ends. Therefore, it is possible to effectively inhibit water from staying in the region above the plate 63. The shape of the upper surface of the plate 63 may alternatively have a substantially circular shape or a tapered shape.

Furthermore, the introduction passage 110 has a large cross section so that water accumulation due to a surface tension of the water does not occur. More concretely, the cross sectional area of the introduction passage 110 is greater than or equal to 30 $mm^2$, the cross section taken along plane perpendicular to an extension direction of the introduction passage 110. A strict condition for the water accumulation is given in a case where the cross section has a circular shape. In other words, in order for water not to accumulate due to the surface tension, it may be necessary for an introduction passage having a circular cross section to have the cross sectional area greater than or equal to the lower limit 30 $mm^2$. When an introduction passage has a rectangular cross section, if the cross sectional area is greater than or equal to 30 $mm^2$, it is possible to effectively inhibit the water accumulation due to the surface tension. That is, when an introduction passage has a cross sectional area greater than or equal to 30 $mm^2$, it is possible to effectively inhibit the water accumulation due to the surface tension, regardless of a shape of the cross section.

According to the example embodiment, a pressure detection space (i.e., a target space for pressure detection) is an internal space of the door of the vehicle. The pressure sensor 1 senses a change in pressure of the internal space of the door due to, for example, a collision between an object and the door. For a sensor for detecting a collision, it is important to restrict error detection. When a sensor is mounted to the internal space of the door, if by any chance water freezes at a surface of a sensing element 40, the ice may be accelerated when the door is opened and closed. In this case, the sensor may sense a pseudo pressure change. When the pressure sensor 1 according to the example embodiment is mounted to the door of the vehicle, it is possible to restrict the error detection arising from the above difficulty.

While the invention has been described with reference to preferred embodiments thereof, it is to be understood that the invention is not limited to the preferred embodiments and construction. The invention is intended to cover various modification and equivalent arrangements. In addition, while the various combinations and configurations, which are preferred, other combinations and configurations, including more, less or only a single element, are also within the spirit and scope of the invention.

What is claimed is:
1. A pressure sensor comprising:
a sensing element that has an exposed lateral end surface including a pressure detection surface, and that detects pressure of air contacting the pressure detection surface;
a housing that houses therein the sensing element, the housing having an opening which opens toward an outside of the housing, the outside being a pressure sensed space; and
an introduction passage that is formed in the housing, the introduction passage causing the lateral end surface of the sensing element to communicate with the opening; wherein
the introduction passage has a first passage portion which contains therein the lateral end surface of the sensing element and extends directly downward at least from the lateral end surface of the sensing element;
the opening is located at or lower than a lower end of the first passage portion;
the housing is provided with a water restriction plate which is disposed in the first passage portion so that the water restriction plate extends across a region defined by all lines interconnecting the lateral end surface of the sensing element and the opening; and
the water restriction plate is located lower than the sensing element and projects from a portion of the housing toward the sensing element, wherein the portion defines the first passage portion so as to cover the sensing element.

2. The pressure sensor according to claim 1, wherein:
the introduction passage further has a second passage portion that is L-shaped;
the second passage portion has a horizontal passage part and a vertical passage part;
the horizontal passage part extends in a horizontal direction from the lower end of the first passage portion; and
the vertical passage part connects one end of the horizontal passage part with the opening.

3. The pressure sensor according to claim 2, wherein:
an upper wall of the horizontal passage part is formed to incline downward toward the opening.

4. The pressure sensor according to claim 1, wherein:
a lower surface of the water restriction plate is formed into a concave shape.

5. The pressure sensor according to claim 1, wherein:
an upper surface of the water restriction plate is formed to incline toward a free end of the water restriction plate.

6. The pressure sensor according to claim 1, wherein:
the introduction passage has a cross section greater than or equal to 30 mm$^2$, the cross section being taken along a plane perpendicular to an extension direction of the introduction passage.

7. The pressure sensor according to claim 1, wherein:
the pressure sensed space is an internal space of a door of a vehicle;
the pressure sensor is a sensor that is used to detect a collision of an object with the vehicle by sensing a change in pressure of the internal space of the door.

8. A pressure sensor comprising:
a sensing element that has an exposed lateral end surface including a pressure detection surface, and that detects pressure of air contacting the pressure detection surface;
a housing that houses therein the sensing element, the housing having an opening which opens toward an outside of the housing, the outside being a pressure sensed space; and
an introduction passage that is formed in the housing, the introduction passage causing the lateral end surface of the sensing element to communicate with the opening; wherein
the introduction passage has a first passage portion which contains therein the lateral end surface of the sensing element and extends directly downward at least from the lateral end surface of the sensing element;
the opening is located at or lower than a lower end of the first passage portion;
the housing is provided with a water restriction plate which is disposed in the first passage portion so that the water restriction plate extends across a region defined by all lines interconnecting the lateral end surface of the sensing element and the opening;
the water restriction plate is located lower than the sensing element and projects from a portion which defines the first passage portion so as to cover the sensing element of the housing toward the sensing element;
the introduction passage further has a second passage portion that is L-shaped;
the second passage portion has a horizontal passage part and a vertical passage part;
the horizontal passage part extends in a horizontal direction from the lower end of the first passage portion; and
the vertical passage part connects one end of the horizontal passage part with the opening.

9. A pressure sensor comprising:
a sensing element that has an exposed lateral end surface including a pressure detection surface, and that detects pressure of air contacting the pressure detection surface;
a housing that houses therein the sensing element, the housing having an opening which opens toward an outside of the housing, the outside being a pressure sensed space; and
an introduction passage that is formed in the housing, the introduction passage causing the lateral end surface of the sensing element to communicate with the opening; wherein
the introduction passage has a first passage portion which contains therein the lateral end surface of the sensing element and extends directly downward at least from the lateral end surface of the sensing element;
the opening is located at or lower than a lower end of the first passage portion;
the housing is provided with a water restriction plate which is disposed in the first passage portion so that the water restriction plate extends across a region defined by all lines interconnecting the lateral end surface of the sensing element and the opening;
the water restriction plate is located lower than the sensing element and projects from a portion which defines the first passage portion so as to cover the sensing element of the housing toward the sensing element;
the introduction passage further has a second passage portion that is L-shaped;
the second passage portion has a horizontal passage part and a vertical passage part;
the horizontal passage part extends in a horizontal direction from the lower end of the first passage portion;
the vertical passage part connects one end of the horizontal passage part with the opening; and
an upper wall of the horizontal passage part is formed to incline downward toward the opening.

* * * * *